(12) United States Patent
Takeshita et al.

(10) Patent No.: US 6,677,023 B2
(45) Date of Patent: Jan. 13, 2004

(54) METHOD OF MAKING MAGNETIC RECORDING MEDIUM UTILIZING DIE

(75) Inventors: Hiroto Takeshita, Kawasaki (JP); Hitoshi Komoriya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 09/812,673

(22) Filed: Mar. 20, 2001

(65) Prior Publication Data

US 2002/0022147 A1 Feb. 21, 2002

(30) Foreign Application Priority Data

Aug. 18, 2000 (JP) ...................................... 2000-248176

(51) Int. Cl.$^7$ ................................................ G11B 5/66
(52) U.S. Cl. ............ 428/65.3; 428/694 T; 428/694 TR; 428/694 BR; 428/694 SG; 428/900; 427/128; 427/129; 427/130; 427/131; 425/542
(58) Field of Search ...................... 428/694 T, 694 TR, 428/694 BR, 694 SG, 900, 65.3; 427/128–131; 425/542

(56) References Cited

U.S. PATENT DOCUMENTS

| | | | | |
|---|---|---|---|---|
| 5,476,700 A | * | 12/1995 | Asai | 428/66.6 |
| 5,867,350 A | * | 2/1999 | Haga | 360/113 |
| 5,868,806 A | * | 2/1999 | Nishio | 51/297 |
| 6,068,906 A | * | 5/2000 | Sasa | 428/64.2 |
| 6,146,740 A | * | 11/2000 | Birukawa | 428/141 |
| 6,177,175 B1 | * | 1/2001 | Hashimoto | 428/141 |
| 6,347,016 B1 | * | 2/2002 | Ishida | 360/17 |

FOREIGN PATENT DOCUMENTS

JP 10-083640 * 3/1998

* cited by examiner

Primary Examiner—Leszek Kiliman
(74) Attorney, Agent, or Firm—Greer, Burns & Crain, Ltd.

(57) ABSTRACT

A non-magnetic substrate for a magnetic recording medium is formed or molded within a die. The die is designed to define embedment depressions on the surface of the resulting non-magnetic substrate. Any bumps or lugs formed on the inner surface of the die can be employed to form the embedment depressions on the non-magnetic substrate. A magnetic material fills the individual embedment depression so as to establish a magnetic block embedded into the surface of the non-magnetic substrate. The magnetic block can be utilized as a positional mark in a tracking servo control for a corresponding read/write head in a magnetic storage system.

14 Claims, 8 Drawing Sheets

METHOD OF MAKING MAGNETIC RECORDING MEDIUM UTILIZING DIE

BACKGROUND OF THE INVENTION

1. Field of the Invention

The present invention relates to a magnetic recording medium incorporated within a magnetic disk drive or storage system such as a hard disk drive (HDD). In particular, the invention relates to a method of making a magnetic recording medium comprising a disk-shaped non-magnetic substrate and a magnetic block embedded into the surface of the non-magnetic substrate so as to establish a positional mark.

2. Description of the Prior Art

For example, Japanese Patent Application Laid-open No. 10-83640 discloses a magnetic recording disk or hard disk (HD) comprising a disk-shaped non-magnetic substrate and magnetic blocks or pieces embedded into the surface of the non-magnetic substrate. The magnetic pieces are designed to establish positional marks utilized in the servo control of a read/write head. In process of producing the hard disk, embedment depressions for receiving the respective magnetic pieces are defined on the surface of the non-magnetic substrate. As conventionally known, such a non-magnetic substrate can be represented by a glass wafer, a silicon wafer, an aluminum wafer covered with an NiP lamination, and the like.

As disclosed in the aforementioned Laid-open No.10-83640, a reactive ion etching (RIE) process is usually employed to form the embedment depressions. The RIE process is designed to utilize a photomask so as to transfer the arrangement of the magnetic pieces, namely, a servo pattern, onto a photoresist spreading over the surface of the non-magnetic substrate. As conventionally known, the photomask is subjected to a contact exposure. In this contact exposure, the servo pattern established in the photoresist cannot fully reflect the accuracy of the servo pattern defined in the photomask. The servo pattern in the photoresist suffers from some deviation from the model pattern. In addition, the mass production of the substrate employing the RIE process should include repetition of stages, such as application of the photoresist, exposure and development, etching, and the like, for the individual wafers. It leads to an increased production cost and a deteriorated efficiency of production.

SUMMARY OF THE INVENTION

It is accordingly an object of the present invention to provide a method, of making a magnetic recording medium, suitable to mass production at a lower cost in a shorter cycle. It is another object of the present invention to provide a magnetic recording medium capable of realizing the arrangement or pattern of magnetic blocks for positional marks at a higher accuracy, and a method of making the same.

According to a first aspect of the present invention, there is provided a method of making a magnetic recording medium, comprising: forming or molding a disk-shaped non-magnetic substrate with a die, said non-magnetic substrate defining an embedment depression on a surface; and filling the embedment depression with a magnetic material so as to form a magnetic block for a positional mark.

The method of this type enables the production of the non-magnetic substrate suitable to a magnetic recording medium by utilizing the die or mold. As well known, the dimensional accuracy of a molded or resulting product taken out of the die usually depends on the dimensional accuracy of the die. If the arrangement and/or contour of the embedment depression can be defined in the die at a higher dimensional accuracy, it is possible to form the embedment depression on the surface of the non-magnetic substrate at a higher accuracy as expected. The magnetic block is allowed to reliably reflect the accuracy of the die as designed.

Utilization of the die in the method enables mass production of the non-magnetic substrate with a single die. For example, hundreds of thousands of the non-magnetic substrates may share the production cost of the die. Even when the die suffers from a higher production cost, it is possible to reduce the cost for the individual non-magnetic substrates by sharing. A cheaper magnetic recording disk can be obtained.

Moreover, the above-described method enables the formation of the embedment depression during molding, namely, within the die. It is not necessary to prepare relatively expensive equipment or plants for achieving application of a photoresist, exposure and development, etching, and the like, in defining the embedment depression on the surface of the non-magnetic substrate. As compared with the case where reactive ion etching (RIE) is employed to form the depression, for example, the production cost per an individual non-magnetic substrate can be reduced to the utmost. In addition, employment of the above-described method enables elimination of processes such as application of a photoresist, exposure and development, and etching for individual non-magnetic substrates, so that the efficiency of the production can be improved. Great numbers of the non-magnetic recording disks can be produced in a shorter cycle.

The method of making may further comprise: pouring a fluid non-magnetic material into the die; and forming a sinter of the non-magnetic substrate out of the fluid non-magnetic material within the die. This method allows the resulting sinter to reliably reflect the shape of a cavity or hollow space defined within the die. The non-magnetic substrates of the identical shape or form can constantly be obtained unless the die suffers from deformation.

Here, a polycarbodiimide may be employed as the fluid non-magnetic material. Dehydration of the polycarbodiimide enables establishment of the sinter corresponding to a disk-shaped non-magnetic substrate containing carbon. The non-magnetic substrate of this type exhibits a sufficient heat resisting property during the subsequent formation of a seed crystal layer, a surface magnetic layer and a protection layer. For example, the non-magnetic substrate may suffer from a higher temperature smaller than 400 degrees Celsius during sputtering. Alternatively, the fluid non-magnetic material may be a gel of $(Bi_2O_3)_{20}(SiO_2)_{80}$ containing a polyethylene glycol of molecular weight ranging 200 to 600, for example. Dehydration of the gel serves to provide a sintered non-magnetic substrate containing $SiO_2$. Likewise, the non-magnetic substrate of this type is allowed to have a sufficient heat resisting property during the subsequent formation of a seed crystal layer, a surface magnetic layer and a protection layer.

It is preferable that the aforementioned magnetic block is magnetized along the vertical direction perpendicular to the surface of the non-magnetic substrate. In this case, the magnetic recording medium may be inserted into a magnetic field including a magnetic flux running in a specific single direction. The magnetic field of this type allows all the magnetic blocks, embedded in the magnetic recording disk, to simultaneously be magnetized in the vertical direction. The efficiency of the production can still further be improved. A coil of a size enough to contain the overall magnetic recording medium within its inner space may contribute to establishment of the magnetic field of the above-described type based on electromagnetic induction.

According to a second aspect of the present invention, there is provided a magnetic recording medium comprising: a disk-shaped non-magnetic substrate; a depression defining an embedment space opened at a surface of the non-magnetic substrate; and a magnetic block embedded within the embedment space, said magnetic block magnetized along a vertical direction perpendicular to the surface of the non-magnetic substrate.

The magnetic recording medium enables a reliable leakage of a magnetic field out of the magnetic block embedded in the non-magnetic substrate. The magnetic field of the magnetic block can be utilized in a tracking servo control of a corresponding read/write head, for example. Moreover, the magnetization of the magnetic block or blocks can be achieved in a facilitated manner as described above.

The magnetic block may include, in order to establish the vertical magnetization, a first metallic film containing at least one of Pt, Pd and Au, and a second metallic film superposed on the first metallic film. The second metallic film may contain at least Co. Alternatively, the magnetic block may contain at least Fe and either of Pt or Pd. Otherwise, the magnetic block may include an alloy film containing Co, Ni and P.

According to a third aspect of the present invention, there is provided a die for making a substrate of a magnetic recording medium, comprising an interior surface defining a hollow space corresponding to a shape of the substrate. The die of this type greatly contributes to achievement of the aforementioned method of making suitable to mass production of the non-magnetic substrates for the magnetic recording mediums. It is possible to reliably reduce the cost for the individual non-magnetic substrates. A cheaper magnetic recording disk can be obtained. In this case, the interior surface of the die may include a bump corresponding to the aforementioned embedment depression defined on the non-magnetic substrate.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
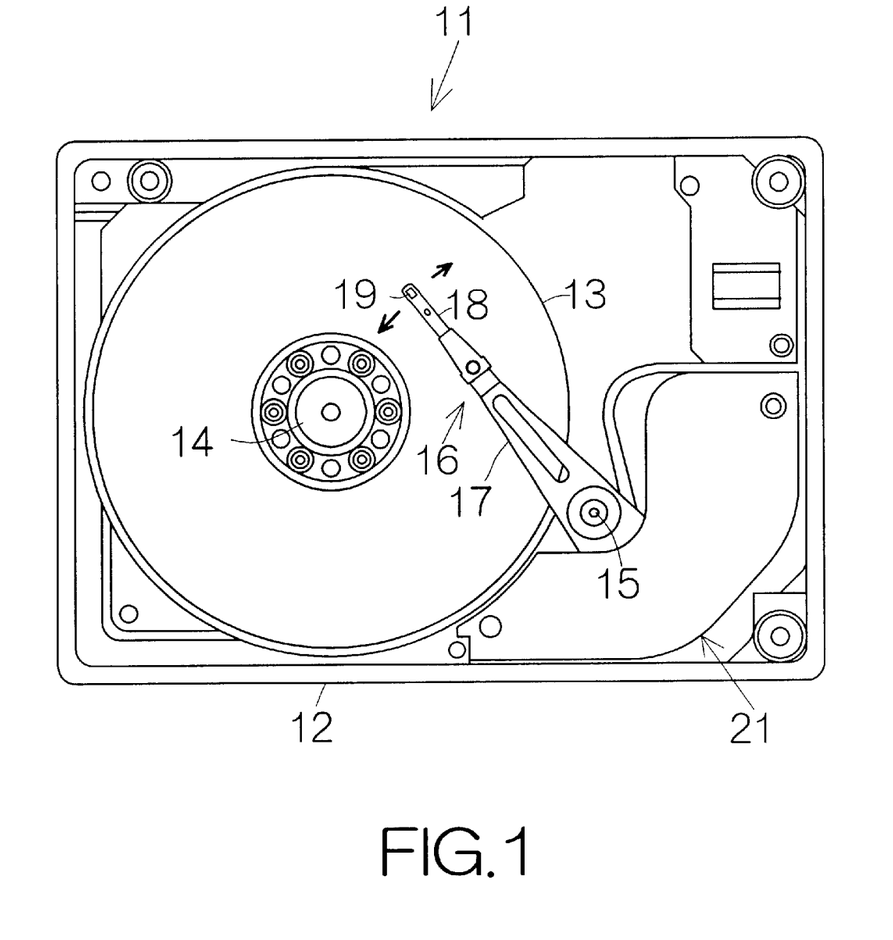
FIG. 1 is a plan view schematically illustrating the interior structure of a hard disk drive (HDD)

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

A write head element and a read head element, both not shown, are mounted on the flying head slider 19. The write head element serves to write a magnetic binary data into the magnetic recording disk 13. The read head element is designed to read a magnetic binary data out of the magnetic recording disk 13. A thin film magnetic head, for example, utilizing a magnetic field or flux induced in a thin film swirly coil pattern, may be employed as the write head element. The thin film magnetic head is allowed to expose its write gap at the bottom surface of the flying head slider 19 opposed to the surface of the magnetic recording disk 13. On the other hand, the read head element can be represented by a magnetoresistive (MR) element such as a giant magnetoresistive (GMR) element, a tunnel-junction magnetoresistive (TMR) element, and the like. The MR element is likewise allowed to expose its read gap at the bottom surface of the flying head slider 19.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
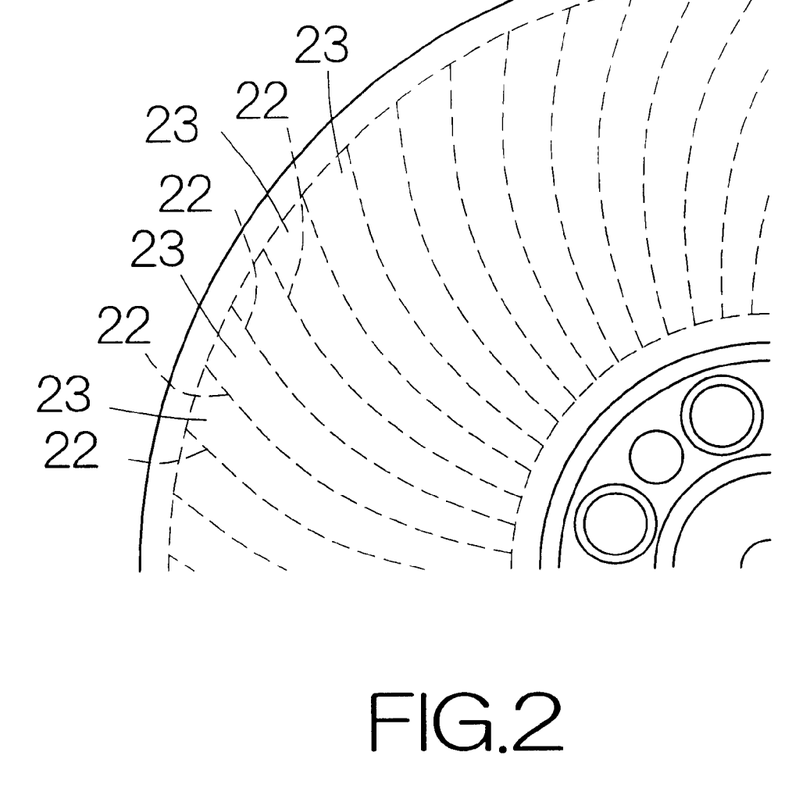
FIG. 2 is an enlarged partial plan view of a magnetic recording disk for schematically illustrating sector regions.

As shown in FIG. 2, stripes of bent sector regions 22, for example, sixty of those, are defined on the front and back surfaces of the magnetic recording disk 13, respectively, so as to extend in the radial direction of the magnetic recording disk 13. The individual sector region 22 is allowed to have the maximum width of approximately 100.0 $\mu$m. Data storage regions 23 are established between the adjacent sector regions 22 for holding the magnetic information or binary data.

Figure 3:
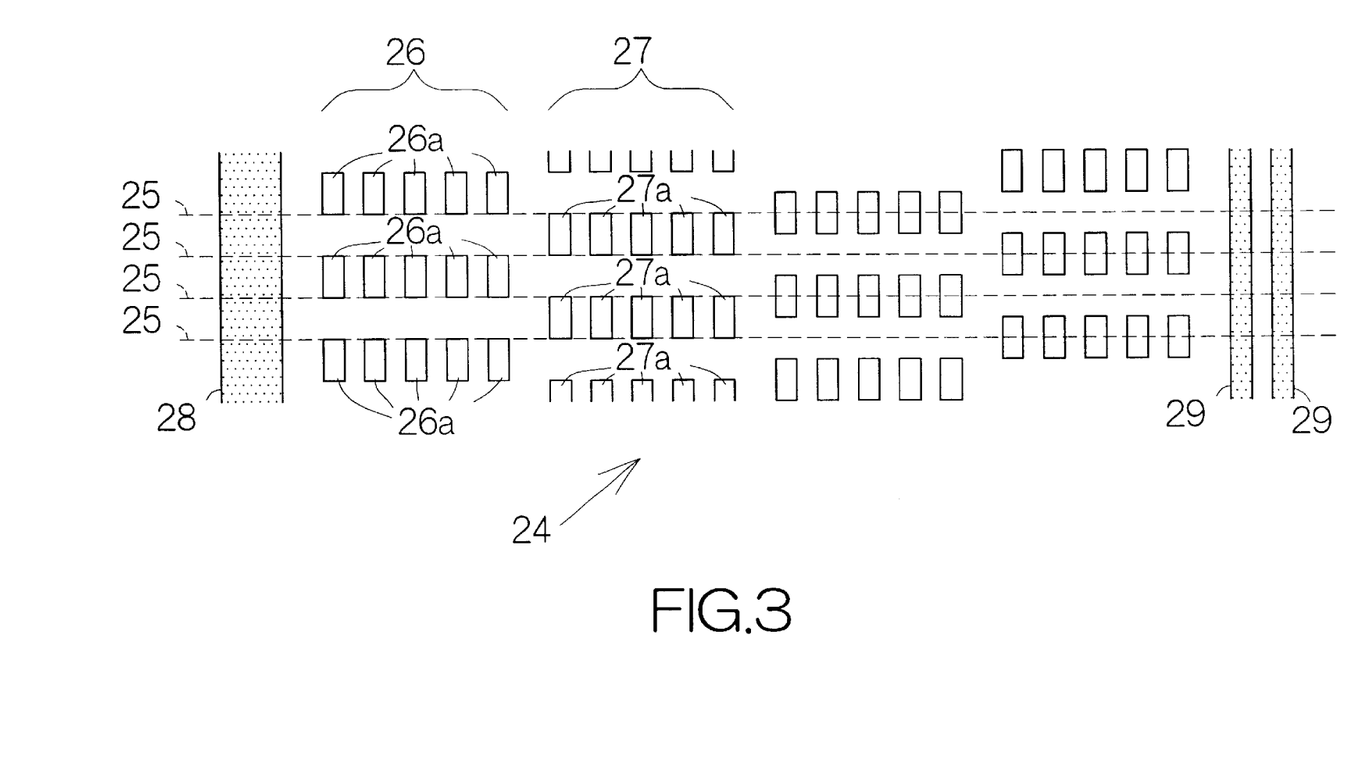
FIG. 3 is an enlarged partial view of the sector region for illustrating a servo pattern.

A servo pattern 24 is formed in the individual sector region 22 so as to extend in the circumferential direction of the magnetic recording disk 13, as shown in FIG. 3, for example. The servo pattern 24 includes a first magnetized section set 26 and a second magnetized section set 27 alternately located in spaces between reference lines 25. The reference lines 25 correspond to concentric circles spaced at constant intervals. A first magnetized information area 28 is defined upstream of the servo pattern 24 so as to identify the upstream end or beginning of the servo pattern 24. Likewise, a second magnetized information area 29 is defined downstream of the servo pattern 24 so as to identify the downstream end or termination of the servo pattern 24. The terms such as "upstream" and "downstream" are designed to specify the direction in accordance with the movement of the flying head slider 19 over the servo pattern 24 during rotation of the magnetic recording disk 13. In addition, the identification (ID) areas, not shown, are also defined in the sector regions 22 so as to identify the track IDs or numbers of the individual reference lines 25, namely, the individual recording tracks.

First magnetized sections 26a are arranged along the reference lines 25 in the first magnetized section set 26 near the upstream side in the circumferential direction. Likewise, second magnetized sections 27a are arranged along the reference lines 25 in the second magnetized section set 27 near the downstream side in the circumferential direction. The individual first and second magnetized sections 26a, 27a are designed to have a rectangular shape with four sharp corners. As is apparent from FIG. 3, the adjacent reference lines 25 are allowed to trace the opposite sides or straight contour lines of the individual first and second magnetized sections 26a, 27a.

When the magnetic recording disk 13 rotates, the magnetic fields leaked out of the individual first and second magnetized sections 26a, 27a are detected at the read head element on the flying head slider 19. If the read head element moves right along the reference line 25, the level of the first detection signal corresponding to the level of the magnetic field at the first magnetized section 26a is precisely balanced with that of the second detection signal corresponding to the level of the magnetic field at the second magnetized section 27a, as conventionally known. If such a balance is constantly maintained in every sector region 22, a recording track right on the reference line 25 can be established on the magnetic recording disk 13 as expected.

On the other hand, if the read head element deviates from the reference line 25 inward or outward in the radial direction of the magnetic recording disk 13, an imbalance can be established between the first and second detection signals. The first detection signal reaches the level larger than the second detection signal, or takes the value smaller than the second detection signal. In these cases, the flying head slider 19 is driven to shift or move in the radial direction of the magnetic recording disk 13 so as to reduce or null the difference between the first and second detection signals. A tracking servo control of the flying head slider 19 can be achieved in this manner. The read head element is thus forced to trace the reference lines 25 at a higher accuracy.

Figure 4:
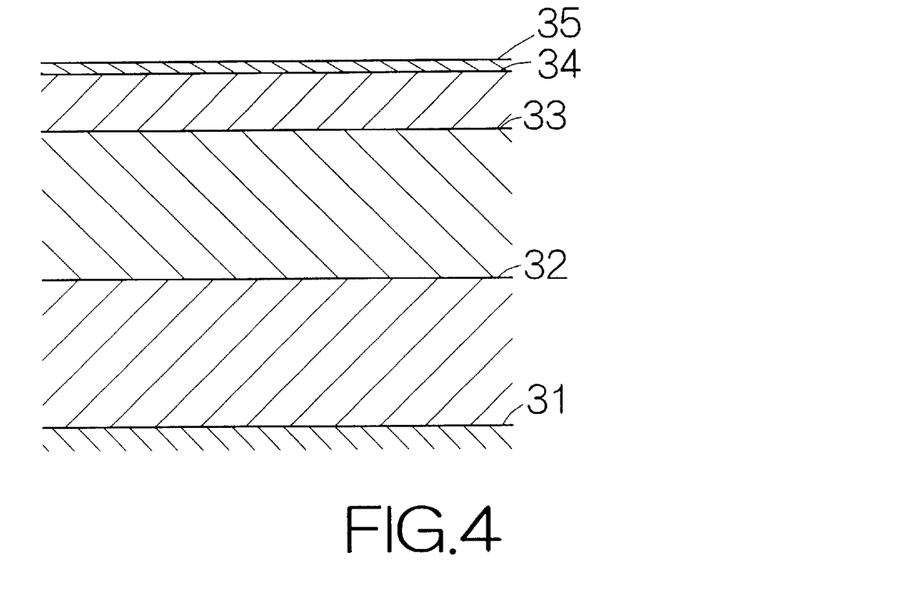
FIG. 4 is an enlarged partial sectional view schematically illustrating the structure of the magnetic recording disk.

Here, a detailed description will be made on the structure of the magnetic recording disk 13. The magnetic recording disk 13 includes a disk-shaped non-magnetic substrate 31 as a support member, as shown in FIG. 4. The non-magnetic substrate 31 is made of an amorphous or glassy carbon, for example. Alternatively, $SiO_2$ can be selected as a primary material to form the non-magnetic substrate 31. The non-magnetic substrate 31 is preferably allowed to exhibit a heat resisting property to a higher temperature ranging 200 to 400 degrees Celsius, for example.

A seed crystal layer 32 such as an alloy layer containing non-magnetic or Cr atoms, for example, is allowed to spread over the front and back surfaces of the non-magnetic substrate 31. The seed crystal layer 32 may be a pure Cr layer. A surface magnetic layer 33 such as a Co-based alloy, for example, is allowed to spread all over the surface of the seed crystal layer 32. The surface magnetic layer 33 is designed to hold magnetic information or binary data. The surface magnetic layer 33 is covered with a protection layer 34 such as a diamond-like-carbon (DLC) layer and a lubricating agent or oil 35, for example.

Figure 5:
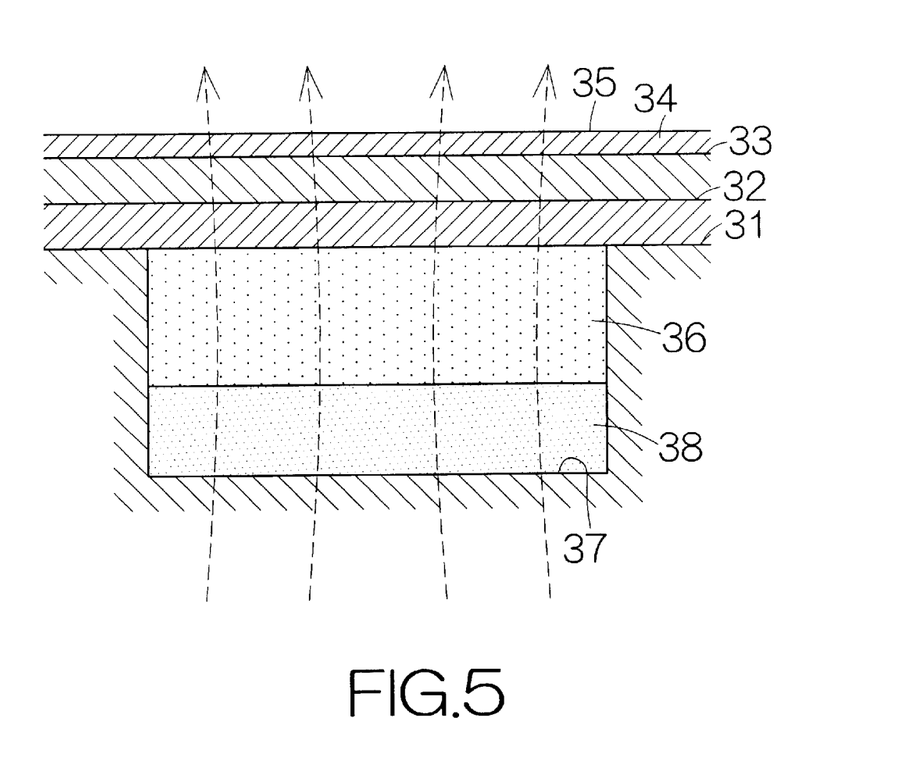
FIG. 5 is a partial sectional view illustrating in detail the structure of a magnetic piece as a servo mark.

As shown in FIG. 5, a magnetic block or piece 36 for a positional mark is embedded into the surface of the non-magnetic substrate 31. This magnetic piece 36 serves to establish the individual first and second magnetized section 26a, 27a. The magnetic piece 36 infills a depression 37 defined on the surface of the non-magnetic substrate 31. The depression 37 is designed to define an embedment space opened at the surface of the non-magnetic substrate 31. The embedment space is allowed to receive the magnetic piece 36. The embedment space takes the form of a cube or rectangular parallelepiped with eight sharp apices.

The magnetic piece 36 is magnetized along the vertical direction perpendicular to the surface of the non-magnetic substrate 31. The magnetic piece 36 may be a CoNiP alloy film, for example. The CoNiP alloy film covers over an NiP base layer 38 overlaying the bottom of the depression 37 so as to infill the depression 37, as described later in detail. Alternatively, the magnetic piece 36 may be a layered material including first and second metallic films alternately superposed, an alloy film containing at least Fe and either of Pt or Pd, and the like. The first metallic film of the layered material may be comprised of any of Pt, Pd and Au, while the second metallic film may be a Co-based alloy thin film having a thickness equal to or smaller than 1.0 nm. In these cases, it is unnecessary to cover the bottom with an NiP base layer in the depression 37, as described later in detail. Here, an alloy film containing any combination of Pt, Pd and Au may be employed as the first metallic film in the layered material.

The employment of the aforementioned magnetic piece 36 in the above-described manner enables establishment of the first and second magnetized sections 26a, 27a of a rectangular contour with four sharp corners. The magnetized section 26a, 27a of a sharp rectangular contour leads to generation of a clear and sharp detection signal in the read head element. Moreover, the vertical magnetization utilized in the individual magnetized section 26a, 27a contributes to a further enhancement of a clear detection signal. The S/N ratio can significantly be improved in the detection signal output from the read head element. The flying head slider 19 can thus reliably be positioned at a higher accuracy right on the reference lines 25 as mentioned above during the tracking servo control.

Figure 6:
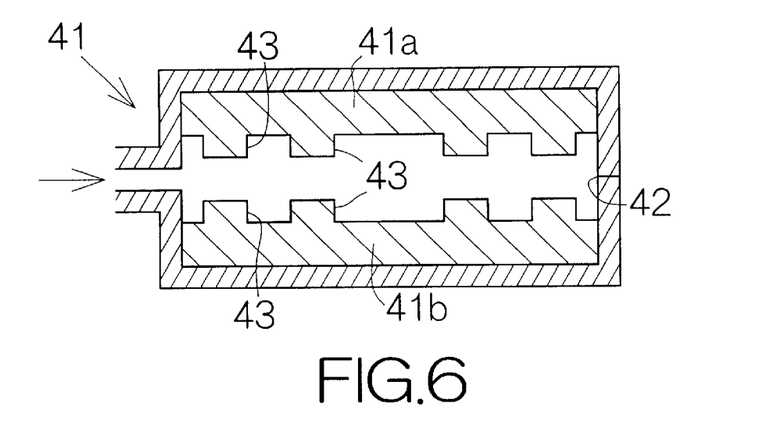
FIG. 6 is a notional sectional view schematically illustrating a method of making a non-magnetic substrate with a die.

Next, a detailed description will be made on a method of making the magnetic recording disk 13. First of all, the disk-shaped non-magnetic substrate 31 is formed with a die. As shown in FIG. 6, an injection molding apparatus 41 may be employed to form the non-magnetic substrate 31. Upper and lower stampers 41a, 41b are set within the die of the injection molding apparatus 41. The upper and lower stampers 41a, 41b serve to define a hollow space or cavity 42, corresponding to the form of the non-magnetic substrate 31, in the die of the injection molding apparatus 41. Embossing bumps or lugs 43 of approximately 100.0 nm tall are defined on the interior surface of the die, namely, the exposed surfaces of the stampers 41a, 41b. The bumps 43 serve to form the depressions 37 on the surface of the resulting non-magnetic substrate 31. A detailed description will later be made on a method of making the stampers 41a, 41b.

A fluid non-magnetic material is poured into the cavity 42. A polycarbodiimide may be employed as the fluid non-magnetic material, for example. The die of the injection molding apparatus 41, into which the fluid non-magnetic material has been poured, is then subjected to a heat treatment in a pressurized condition, for example, until the fluid non-magnetic material is dehydrated. Heat is required to have the temperature of approximately 100 degrees Celsius and the duration of approximately 10 min so as to completely dry the polycarbodiimide.

Figure 7:
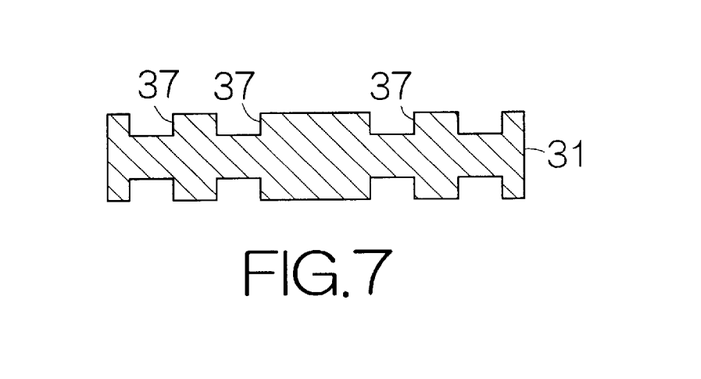
FIG. 7 is a notional sectional view schematically illustrating the method of making the non-magnetic substrate with the die.

After the fluid non-magnetic material has been dried up, the die of the injection molding apparatus 41 is again subjected to a heat treatment. The heat treatment serves to form the sinter of the poured non-magnetic material between the stampers 41a, 41b within the die. The sinter corresponds to the non-magnetic substrate 31. In this case, when heat of approximately 1,050 degrees Celsius is maintained for duration of approximately 60 min, for example, the polycarbodiimide is transformed into a carbonaceous sinter. As shown in FIG. 7, the non-magnetic substrate 31 of the carbon can be obtained. The formation of the non-magnetic substrate 31 has been completed. The depressions 37 of approximately 100.0 nm deep are formed on the exposed surface of the non-magnetic substrate 31.

Figure 8:
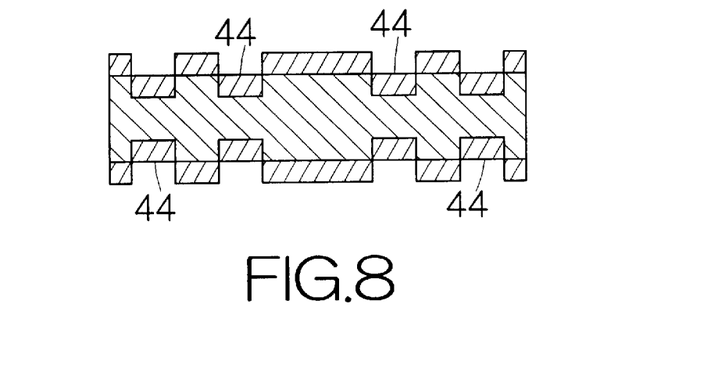
FIG. 8 is a notional sectional view schematically illustrating the process of cumulating a magnetic material for forming the magnetic piece within a depression.

The individual depression 37 of the non-magnetic substrate 31 is filled with a ferromagnetic or ferrimagnetic material 44. As shown in FIG. 8, for example, the magnetic material 44 may be deposited or cumulated on the entire surface of the non-magnetic substrate 31. Electroplating or non-electroplating can be employed to achieve the deposition or cumulation of the magnetic material 44, for example. Liquid-phase deposition such as electroplating or non-electroplating is expected to completely fill the space within the depression 37 with the magnetic material 44 without any voids, which cannot usually be achieved by vapor-phase deposition such as sputtering. The magnetic material 44 is allowed to reflect the shape of the embedment space defined by the depression 37 at a higher dimensional accuracy. The magnetic material may overspill out of the depression 37.

If non-electroplating is employed to fill the depression 37 with the magnetic material 44, an NiP base layer can be employed as a seed layer, for example. The non-electroplating allows a CoNiP alloy film to grow on the surface of the NiP base layer. In this case, sputtering may be employed to form the NiP base layer on the surface of the non-magnetic substrate 31, for example. The CoNiP alloy film of approximately 70.0 nm thickness is allowed to grow over the NiP base layer of approximately 40.0 nm thickness. A redundant thickness of approximately 10.0 nm is established in the CoNiP alloy film. Such a redundant thickness will be subjected to a flattening treatment as described below.

Figure 9:
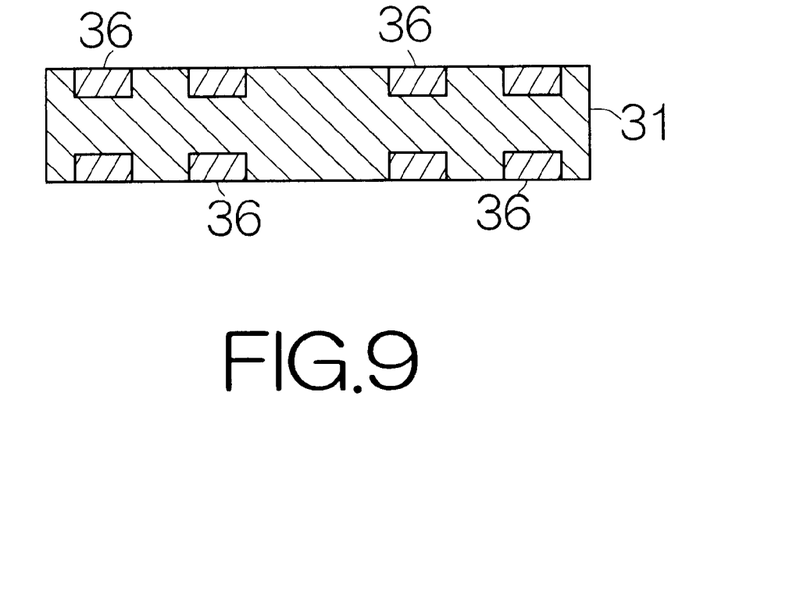
FIG. 9 is a notional sectional view schematically illustrating a flattening treatment of the non-magnetic substrate for forming the magnetic piece within the depression.

The non-magnetic substrate 31 is thereafter subjected to a flattening treatment. The flattening treatment serves to eliminate not only the magnetic material 44 surrounding the depression 37 on the surface of the non-magnetic substrate 31 but also the magnetic material 44 corresponding to the redundant thickness overspilling out of the depression 37, as shown in FIG. 9. The magnetic material 44 filling the depression 37 corresponds to the magnetic block or piece 36 as a positional mark utilized in the aforementioned tracking servo control. The magnetic piece 36 formed in the above-described manner is allowed to reflect the shape of the embedment space defined within the depression 37 at a higher dimensional accuracy. The magnetic piece 36 defines the rectangular top surface of 1.6 $\mu$m×0.8 $\mu$m dimensions exposed at the surface of the non-magnetic substrate 31.

The flattening treatment can be represented by chemical mechanical polishing (CMP), for example. The CMP may employ a colloidal silica slurry as an abrasive. The exposed surface of the non-magnetic substrate 31 is allowed to have the surface roughness Ra equal to or smaller than 0.5 nm if the following condition is established: the rotation speed of the faceplate is set at 50 rpm; the applied load is set at 21.6N; and the operation time is set at 20 min, for example.

Figure 10:
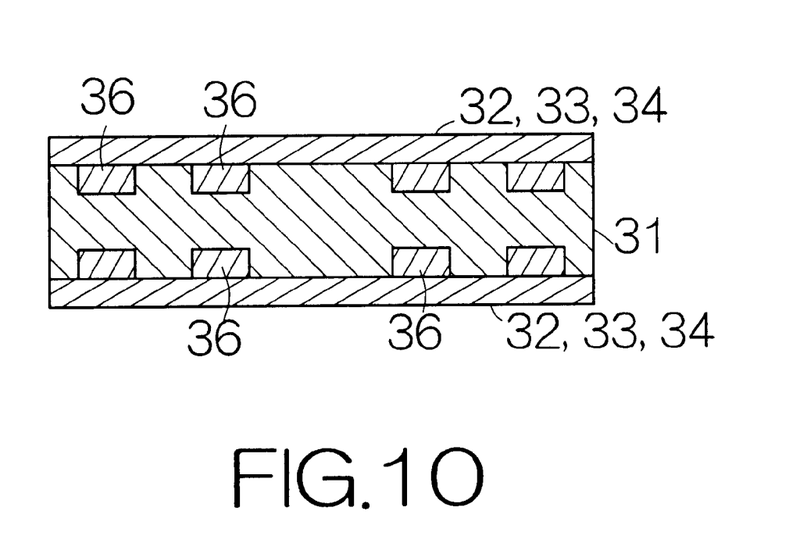
FIG. 10 is a notional sectional view schematically illustrating the process of forming a seed crystal layer, a surface magnetic layer and a protection layer.

As shown in FIG. 10, the seed crystal layer 32, the surface magnetic layer 33 and the protection layer 34 are formed in this sequence on the flattened surface of the non-magnetic substrate 31. The seed crystal layer 32, the surface magnetic layer 33 and the protection layer 34 cover over the top surface of the magnetic pieces 36 embedded into the non-magnetic substrate 31. The seed crystal layer 32 may be a $Cr_{90}Mo_{10}$ alloy layer of approximately 20.0 nm thickness, for example. The surface magnetic layer 33 may be a $Co_{68}Cr_{20}Pt_{10}Ta_2$ alloy layer of approximately 20.0 nm thickness. The protection layer 33 may employ a DLC film of approximately 8.0 nm thickness. Sputtering may be employed to form the seed crystal layer 32, the surface magnetic layer 33 and the protection layer 34, respectively. The lubricating agent 35 of approximately 1.5 nm thickness is applied to the flat surface of the protection layer 34. The lubricating agent 35 may employ a perfluoropolyether-based lubricant. Dipping method may be employed to apply the lubricating agent 35 onto the surface of the non-magnetic substrate 31, for example.

Figure 11:
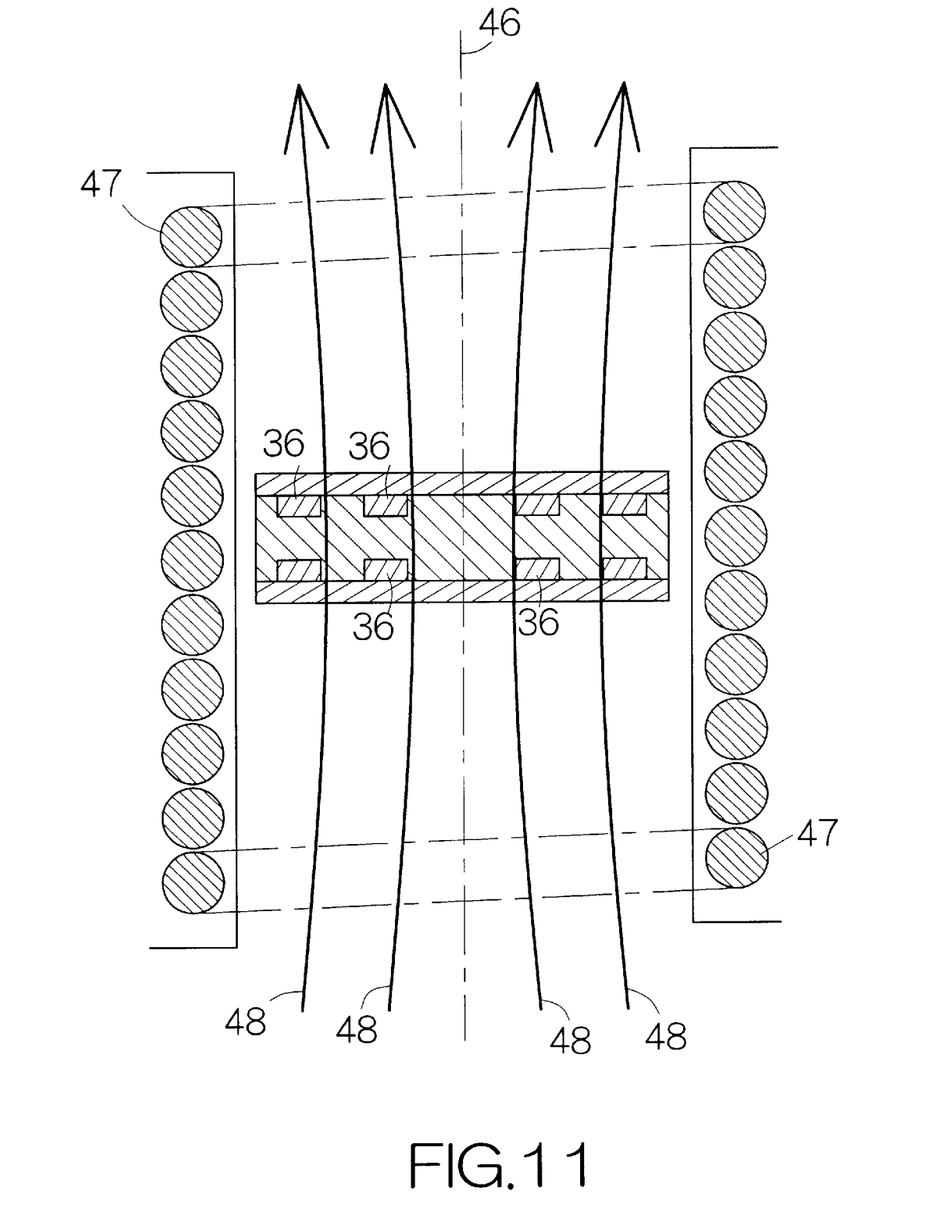
FIG. 11 is a notional sectional view schematically illustrating the process of magnetizing the magnetic pieces on the non-magnetic substrate.

The magnetic piece 36 is thereafter magnetized along the vertical direction perpendicular to the surface of the non-magnetic substrate 31. As shown in FIG. 11, for example, the non-magnetic substrate 31 is inserted into the inner space of a large-sized coil 47 wound around a central axis 46. The large-sized coil 47 is designed to generate a magnetic flux 48 running along the central axis 46 based on electromagnetic induction. The magnetic flux 48 of this type allows all the magnetic pieces 36, embedded in the single non-magnetic substrate 31, to simultaneously be magnetized in the vertical direction. The magnitude of the magnetic field in the large-sized coil 47 may be set at approximately 1,600 kA/m, for example. The large-sized coil 47 may comprise a superconductive coil, for example.

The above-described method enables mass production of the non-magnetic substrates 31, for example, hundreds of thousands of those, with a single die, namely, a pair of stampers 41a, 41b. It is thus possible to significantly reduce the production cost of a single non-magnetic substrate 31, namely, a single magnetic recording disk 13. Moreover, it is not necessary to repeat application of a photoresist, exposure and development, and etching for individual wafers in the above-described method, so that great numbers of non-magnetic substrates 31 can be obtained in a shorter cycle, as compared with the case where an RIE process is employed to form the depressions on the non-magnetic substrate. The efficiency of the production can be improved.

Figure 12:
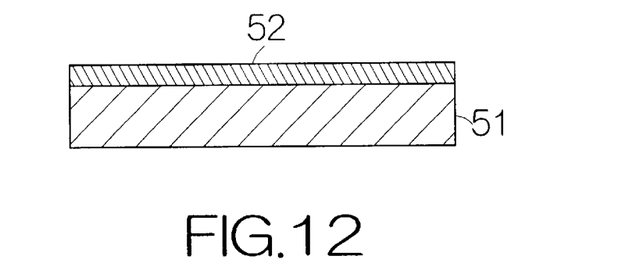
FIG. 12 is a notional sectional view schematically illustrating the process of applying a photoresist onto a stamper material for forming a stamper.

Next, a detailed description will be made on a method of making the aforementioned stampers 41a, 41b. As shown in FIG. 12, a stamper material 51 is first prepared. Mirror finish is effected on the surface of the stamper material 51. The stamper material 51 may be made from tungsten, for example. A photoresist 52 is applied to the surface of the stamper material 51.

Figure 13:
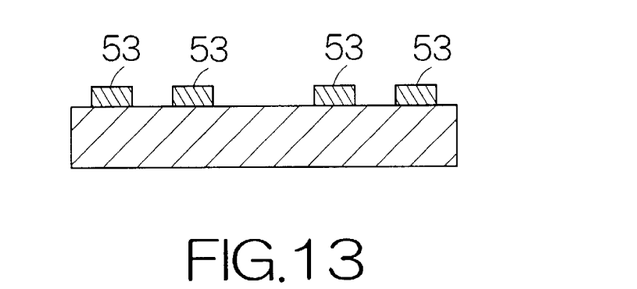
FIG. 13 is a notional sectional view schematically illustrating a photoresist film remaining on the stamper material after exposure and development.

The photoresist 52 is then subjected to exposure on the stamper material 51. The exposure serves to transfer a pattern of a photomask to the photoresist 52. The servo pattern 24, namely, the contours of the depressions 37 are defined in the photomask at a higher dimensional accuracy. After development, a photoresist film 53 remains on the surface of the stamper material 51 so as to overlay the expected shapes of the depressions 37, as shown in FIG. 13.

A laser beam can be employed to achieve the exposure of the photoresist 52, for example. An excimer laser may be employed as a source of the laser beam in this case. The laser beam irradiated from the excimer laser is first led to an object lens of a hemisphere or Weierstrass-sphere shape, such as a solid immersion lens, for example. Such an object lens condenses the laser beam so as to establish a smaller laser spot on the photoresist 52. The smaller laser spot allows the pattern of the photomask to be transferred onto the photoresist 52 at a higher dimensional accuracy. The servo pattern 24 in the photoresist 52 is thus allowed to reliably reflect the accuracy of the pattern defined in the photomask. When a Weierstrass-sphere lens having the refractive index n=2 is employed to condense a laser beam having the wavelength λ of approximately 200.0 nm, the laser spot on the photoresist can be reduced to the diameter of approximately 50.0 nm, for example. Alternatively, employment of an electron beam enables achievement of a smaller spot having the diameter of approximately 50.0 nm.

A flying head slider may be utilized to irradiate the laser beam onto the photoresist. The flying head slider is designed to support or receive the source of the laser beam. When the stamper material 51 is driven to rotate at the revolution rate of 1,200 rpm, for example, the flying head slider is allowed to fly above the surface of the stamper material 51 at the flying height of approximately 120.0 nm. During the flight of the flying head slider, the laser beam is irradiated from the source mounted on the flying head slider.

Figure 14:
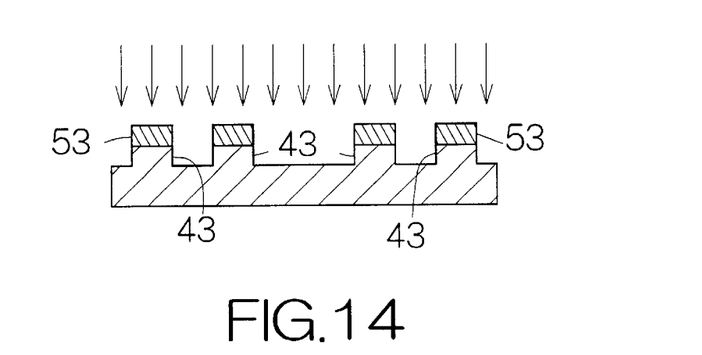
FIG. 14 is a notional sectional view schematically illustrating an etching process.
Figure 15:
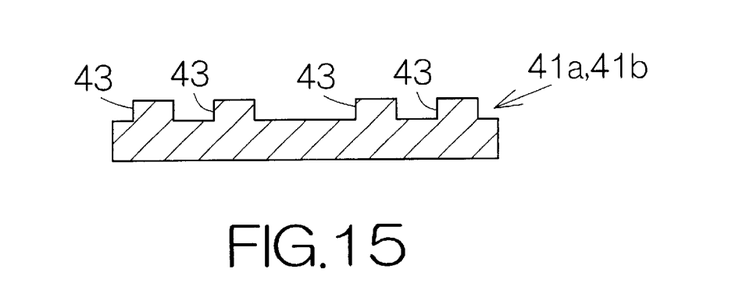
FIG. 15 is a notional sectional view schematically illustrating the resulting stamper.

Etching process is effected on the stamper material 51 after the exposure and development, as shown in FIG. 14. The etching process serves to define the bumps 43 of a rectangular parallelepiped or cube, for example, corresponding to the servo pattern 24. RIE or ion milling may be employed as the etching process, for example. The bumps 43 are allowed to have the height of approximately 100.0 nm. As shown in FIG. 15, the photoresist film 53 remaining on the stamper material 51 is then removed after the etching process. The stampers 41a, 41b have thus been obtained.

The thus obtained stampers 41a, 41b are allowed to define the bumps 43 corresponding to the servo pattern 24 at a higher dimensional accuracy. When the stampers 41a, 41b of this type are employed to form the aforementioned non-magnetic substrate 31, the contours of the depressions 37 can be defined at a higher dimensional accuracy on the non-magnetic substrate 31. The arrangement of the depressions 37, namely, the servo pattern 24 is allowed to fully reflect the accuracy of the stampers 41a, 41b. Accordingly, the magnetic recording disk 13 employing the non-magnetic substrate 31 of this type enables the positioning of the flying head slider 19 at a higher accuracy. This contributes to achievement of a still higher recording density in the magnetic recording disk 13.

The present inventors have examined the characteristic of the magnetic recording disk 13. In this examination, the inventors measured the S/N ratio of the detection signals output from the read head element after decoding as well as the positional accuracy of the flying head slider 19. The core width of the read head element was set at 0.9 μm. The flying height of the flying head slider 19 was set at 20.0 nm.

The inventors also prepared a conventional magnetic recording disk. The conventional magnetic recording disk includes a $Cr_{90}Mo_{10}$ alloy layer of 20.0 nm thickness, a $Co_{68}Cr_{20}Pt_{10}Ta_2$ alloy layer of 20.0 nm thickness and a DLC layer of 8.0 nm thickness superposed in this sequence on a smooth glass substrate. A perfluoropolyether-based lubricant of 1.5 nm thickness was applied to the surface of the DLC layer. A so-called servo track writer was employed to define a servo pattern, namely, magnetized sections, in the $Co_{68}Cr_{20}Pt_{10}Ta_2$ alloy layer. A head slider incorporated in the servo track writer is designed to support a write head element of 1.3 μm core width and a read head element of 0.9 μm core width. The flying height of the head slider was set at 20.0 nm.

It has been confirmed that the flying head slider 19 in combination with the magnetic recording disk 13 according to the invention output the servo signals, after decoding, having the S/N ratio of 32.4 dB. The positional deviation of the flying head slider 19 was allowed to fall within the range of 52.0 nm. On the other hand, only the S/N ratio of 28.1 dB was obtained in the flying head slider in combination with the conventional magnetic recording disk. The positional deviation of the flying head slider fell within the range of 81.0 nm. It is clear that the invention improves the S/N ratio of the servo signals and the positional accuracy of the corresponding flying head slider.

In the above-described method, the fluid polycarbodiimide can be replaced with a gel of $(Bi_2O_3)_{20}(SiO_2)_{80}$ containing a polyethylene glycol of molecular weight ranging 200 to 600 in forming the non-magnetic substrate 31 with a die. In this case, heat of approximately 500 degrees Celsius, for example, serves to form a sinter of $SiO_2$ corresponding to the non-magnetic substrate 31. Still, sputtering may be employed to deposit or cumulate the magnetic material 44 in the case where the magnetic piece 36 is made of the aforementioned layered material comprising the first and second metallic films, or the aforementioned alloy film containing at least Fe and either of Pt or Pd.

Otherwise, the stampers 41a, 41b may be urged against the fluid of a thermosetting resin or ultraviolet reactive resin applied to the exposed surface of a glass plate so as to form the non-magnetic substrate 31. When the fluid is cured in a heat treatment or an irradiation of the ultraviolet, the bumps 43 on the surface of the stampers 41a, 41b serve to form the depressions 37. The non-magnetic substrate 31 can thus be obtained as expected. Likewise, the stampers 41a, 41b may be urged against a substrate material such as a glass wafer in a half-cured or half-hardened state so as to form the non-magnetic substrate 31. When the substrate material completely gets cured or hardened, the depressions 37 can be formed on the surface of the non-magnetic substrate 31 resulting from the substrate material at a higher dimensional accuracy.

It should be noted that the aforementioned magnetic pieces 36 may be utilized in any types of a magnetic recording medium other than the aforementioned hard disk (HD). In addition, the aforementioned method may be utilized to make any types of a magnetic recording medium other than the aforementioned hard disk (HD).

What is claimed is:

1. A method of making a magnetic recording medium, comprising:

forming a disk-shaped non-magnetic substrate with a die, said non-magnetic substrate defining an embedment depression on a surface of the substrate;

filling the embodiment depression with a magnetic material so as to form a magnetic block for a positional mark; and removing the magnetic material from a surface of the non-magnetic substrate at least around the embedment depression.

2. The method of making according to claim 1, further comprising, magnetizing the magnetic block along a vertical direction perpendicular to the surface of the non-magnetic substrate.

3. A method of making a magnetic recording medium, comprising pouring a fluid non-magnetic material into a die;

forming a sinter of a disk-shaped non-magnetic substrate out of the fluid non-magnetic material within the die, said non-magnetic substrate defining an embedment depression on a surface of the substrate; and filling the embedment depression with a magnetic material so as to form a magnetic block for a positional mark.

4. The method of making according to claim 3, further comprising, magnetizing the magnetic block along a vertical direction perpendicular to the surface of the non-magnetic substrate.

5. The method of making according to claim 3, wherein said fluid non-magnetic material is a polycarbodiimide.

6. The method of making according to claim 5, further comprising, magnetizing the magnetic block along a vertical direction perpendicular to the surface of the non-magnetic substrate.

7. The method of making according to claim 3, wherein said fluid non-magnetic material is a gel of $(Bi_2O_3)_{20}(SiO_2)_{80}$ containing a polyethylene glycol of molecular weight ranging from 200 to 600.

8. The method of making according to claim 7, further comprising, magnetizing the magnetic block along a vertical direction perpendicular to the surface of the non-magnetic substrate.

9. A magnetic recording medium comprising:

a disk-shaped non-magnetic substrate;

a depression defining an embedment space opened at a surface of the non-magnetic substrate; and a magnetic block embedded within the embedment space, said magnetic block magnetized along a vertical direction perpendicular to the surface of the non-magnetic substrate.

10. The magnetic recording medium according to claim 9, wherein said magnetic block includes a first metallic film containing at least one of Pt, Pd and Au, and a second metallic film superposed on the first metallic film, said second metallic film containing at least Co.

11. The magnetic recording medium according to claim 9, wherein said magnetic block contains at least Fe and either of Pt or Pd.

12. The magnetic recording medium according to claim 9, wherein said magnetic block includes an alloy film containing Co, Ni and P.

13. A magnetic recording medium comprising:

a disk-shaped non-magnetic substrate made of a sinter containing a carbon;

a depression defining an embedment space opened at a surface of the non-magnetic substrate; and a magnetic block embedded within the embedment space.

14. The method of making according to claim 1, further comprising, forming a magnetic layer over the surface of the non-magnetic substrate so as to cover over the magnetic block.

* * * * *